United States Patent [19]

Lehnert

[11] Patent Number: 4,902,069
[45] Date of Patent: Feb. 20, 1990

[54] SEAT ESPECIALLY FOR A FLIGHT ATTENDANT

[75] Inventor: Franzrudolf Lehnert, Weiskirchen, Fed. Rep. of Germany

[73] Assignee: Messerschmitt-Boelkow-Blohm GmbH, Munich, Fed. Rep. of Germany

[21] Appl. No.: 375,391

[22] Filed: Jul. 3, 1989

[30] Foreign Application Priority Data

Jul. 4, 1988 [DE] Fed. Rep. of Germany ....... 3822574

[51] Int. Cl.$^4$ .............................................. A47C 9/06
[52] U.S. Cl. ....................................... 297/14; 297/90; 297/319
[58] Field of Search .................... 297/90, 14, 319, 320

[56] References Cited

U.S. PATENT DOCUMENTS

| | | | |
|---|---|---|---|
| 1,761,673 | 6/1930 | Laursen | 297/14 |
| 1,784,390 | 12/1930 | Rice | 297/14 |
| 3,093,414 | 6/1963 | Eaques et al. | 297/14 L |
| 3,594,037 | 7/1971 | Sherman | 297/14 |
| 4,460,215 | 7/1984 | Chamberlain et al. | 297/14 |

FOREIGN PATENT DOCUMENTS 570199  1/1924  France .................. 297/90

*Primary Examiner*—James T. McCall
*Attorney, Agent, or Firm*—W. G. Fasse; D. H. Kane, Jr.

[57] ABSTRACT

A seat or chair especially for a flight attendant in an aircraft has a backrest section and a seat section hinged to each other and to a frame in such a way that the backrest section and the seat section can take up different angular positions relative to each other and relative to a vertical frame or to the horizontal. Thus, the chair can be folded to take up several positions including positions in which the seat section takes up lower or higher elevations above the floor. For this purpose the upper end of the back rest section is pivotally guided in a guide mechanism while the lower end of the backrest section is journalled to the rear portion of the seat section at a journal axis which simultaneously forms the journal axis of a support and guide member also hinged to the seat section. The support and guide member is hinged intermediate its ends to the frame through a fixed journal so that the rear edge of the support and guide member can engage a stop in the frame. The guide mechanism at the upper end of the frame permits a tilting motion and a linear sliding motion of the upper end of the backrest section. Thus, the seat section, the backrest section, and the support and guide member together form a type of crank drive. Several positions of the chair may be adjusted, including a lower seat position in which the seat section is slanted relative to the horizontal for an increased comfort.

9 Claims, 6 Drawing Sheets

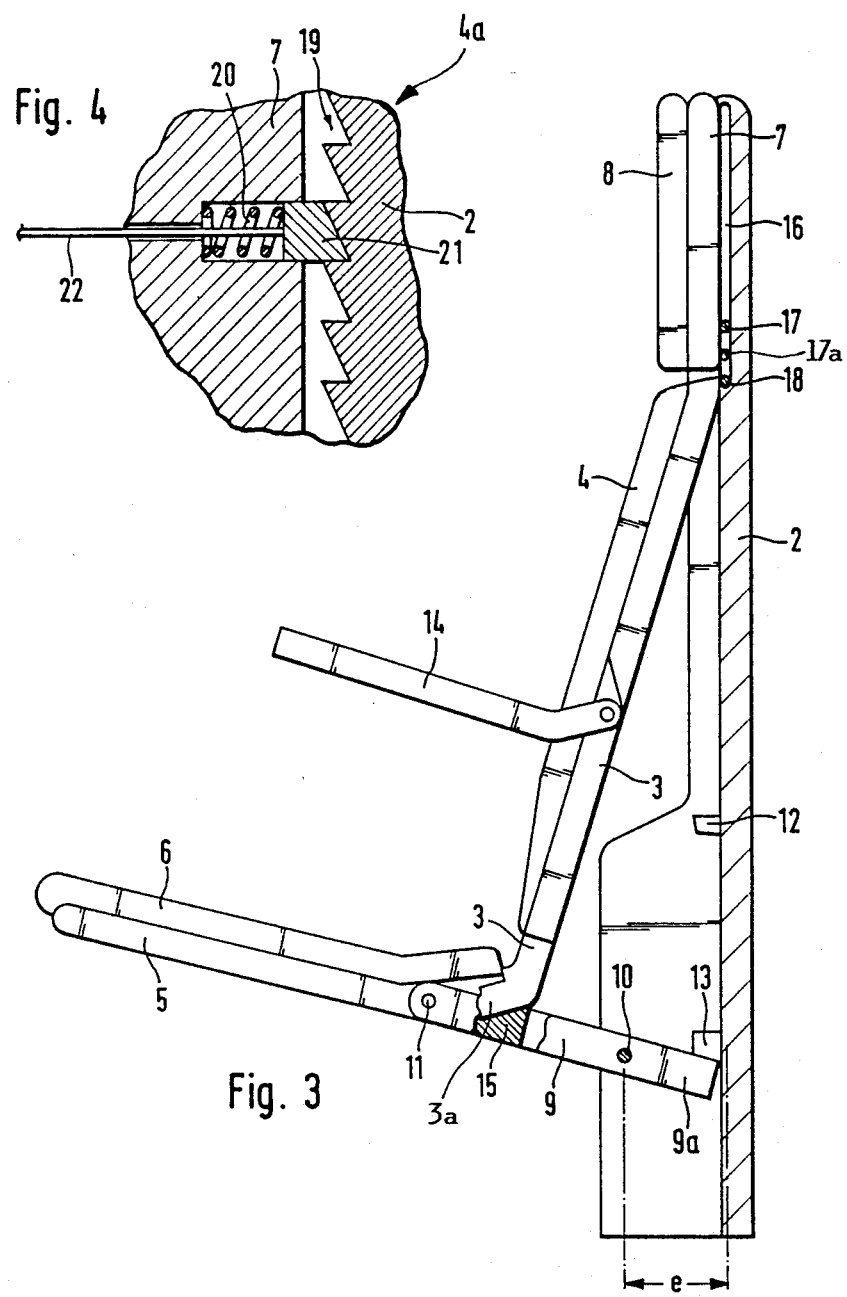

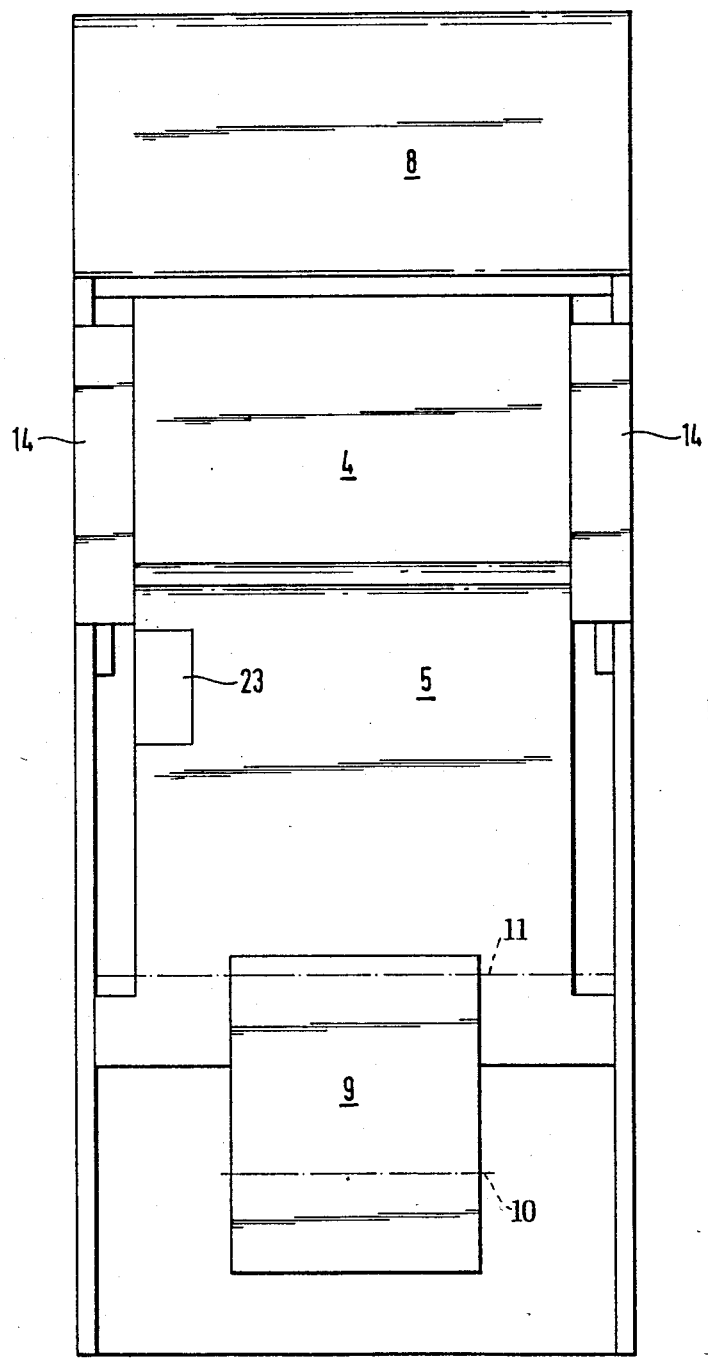
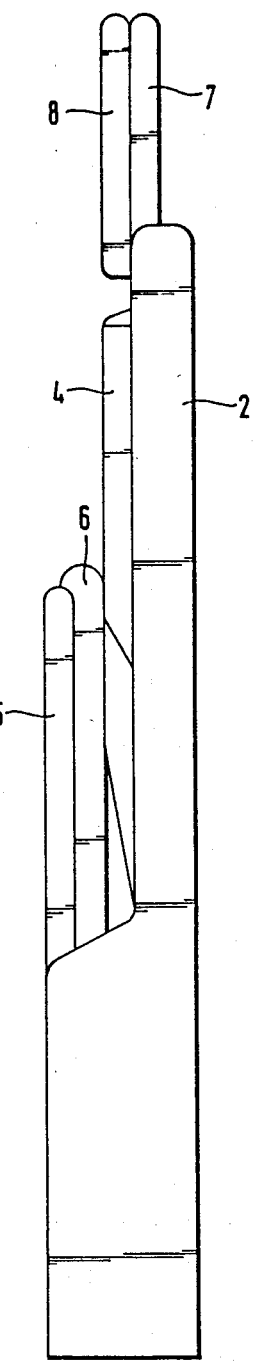
Fig. 5
Fig. 6

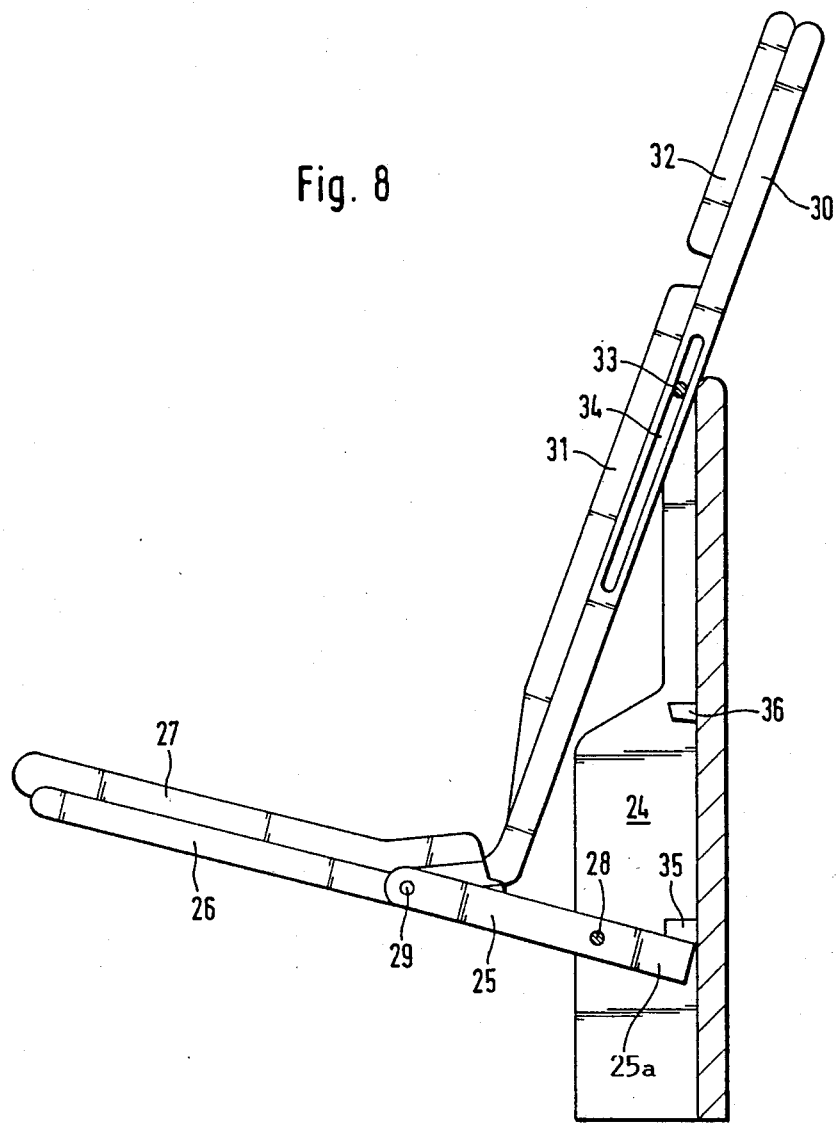

4,902,069

SEAT ESPECIALLY FOR A FLIGHT ATTENDANT

FIELD OF THE INVENTION

The invention relates to a seat especially for a flight attendant. Such a seat has a frame that is rigidly mountable to a component of the aircraft structure, such as a cabin divider wall or a floor dividing a passenger compartment from a cargo compartment or the like.

BACKGROUND INFORMATION

U.S. Pat. No. 4,460,215 (Chamberlain et al.) discloses a flight attendant seat of the above type. The conventional seat comprises a tiltable or foldable seat structure including mounting hardware for mounting the seat to a wall. The seat further includes a seat shell frame having a front portion and a rear portion, the seat further includes a backrest frame having an upper and a lower portion. The seat shell frame is connected with its rear portion to the above mentioned hardware including a first pivot connection, in such a way that the seat shell frame is tiltable generally between a horizontal use position and a generally vertical rest position. A second pivotal connection secures the upper portion of the backrest frame to respective hardware rigidly secured to a wall in such a way that the lower portion of the backrest frame is tiltable between a use position and a rest position. A guide mechanism including an elongated guide hole is provided for operating the backrest frame. One end of the guide mechanism is connected in a pivotal manner to the lower portion of the backrest frame in such a way that the guide mechanism is tiltable between a generally vertical tilted out position and a generally horizontal stop position, whereby the lower portion of the backrest frame is brought into its use position. A crank having a crank pin is rigidly connected with said crank pin to the seat shell frame so that it is tiltable with the seat shell frame. The crank and the guide mechanism cooperate with the seat shell frame and with the backrest frame in such a manner that rearwardly directed loads which are effective in the lower portion of the backrest frame are introduced as compression forces through the guide mechanism into the respective hardware without any torsional forces becoming effective on the guide mechanism.

When the just described conventional seat is brought into its use position, the lower portion of the backrest is tilted about a pivot point located in the upper portion of the backrest. This tiltability of the backrest does not serve the purpose of a comfortable sitting position. Rather, it serves for providing a storage space for the seat portion when the latter is brought into its rest position. This type of conventional seat is relatively uncomfortable, especially during flights of longer duration because in its use position the known seat has a fixed geometry. Thus, it is not possible to adjust the known seat into different seating positions.

OBJECTS OF THE INVENTION

In view of the above it is the aim of the invention to achieve the following objects singly or in combination:

to construct a seat of the type mentioned above in such a way that it provides an improved seating comfort even during flights of longer duration as compared to conventional seats, by providing the user with means for adjusting the seat geometry even when the seat is in its use position;

to provide an adjustment of the seat shell as well as of the backrest into respective different angular positions relative to the vertical and horizontal, respectively; and that a position once adjusted is safely maintained until intentionally changed by the user.

SUMMARY OF THE INVENTION

According to the invention a backrest shell is journalled with its lower portion to a seat shell for pivoting about a common axis. A support and guide member is tiltable about an axis fixed to a seat frame. An outer free end of the support and guide member is pivoted to the seat shell and to the backrest shell at said common axis for tilting about said common axis. A journal at the upper portion of the backrest shell secures the backrest shell to the seat frame so that the backrest shell can perform a tilting motion and a linear displacement motion, whereby the support and guide member forms with the backrest shell basically a crank drive.

It is a special advantage of the invention that a seat section including the seat shell and a seat cushion, and a backrest section including the backrest shell and a backrest cushion can be brought into different positions of use, whereby the seat section and the backrest section are adjustable into different angular positions. Another important advantage of the present invention is seen in that any of the adjusted positions will be safely maintained until intentionally changed by the user, such as a flight attendant.

BRIEF DESCRIPTION OF THE DRAWINGS

In order that the invention may be clearly understood, it will now be described, by way of example, with reference to the accompanying drawings, wherein:

FIG. 3 shows a view similar to that of FIG. 2, but illustrating the seat in another adjusted use position;

FIG. 4 shows a locking mechanism for adjusting a backrest section and/or a headrest section in different vertical positions;

FIG. 5 is a front view in the direction of the arrow V in FIG. 1;

FIG. 6 is a side view similar to that of FIG. 1, but not showing any sectioned parts;

FIG. 8 shows the seat of FIG. 7 in one of its unfolded, use states.

DETAILED DESCRIPTION OF PREFERRED EXAMPLE EMBODIMENTS AND OF THE BEST MODE OF THE INVENTION

Figure 1:
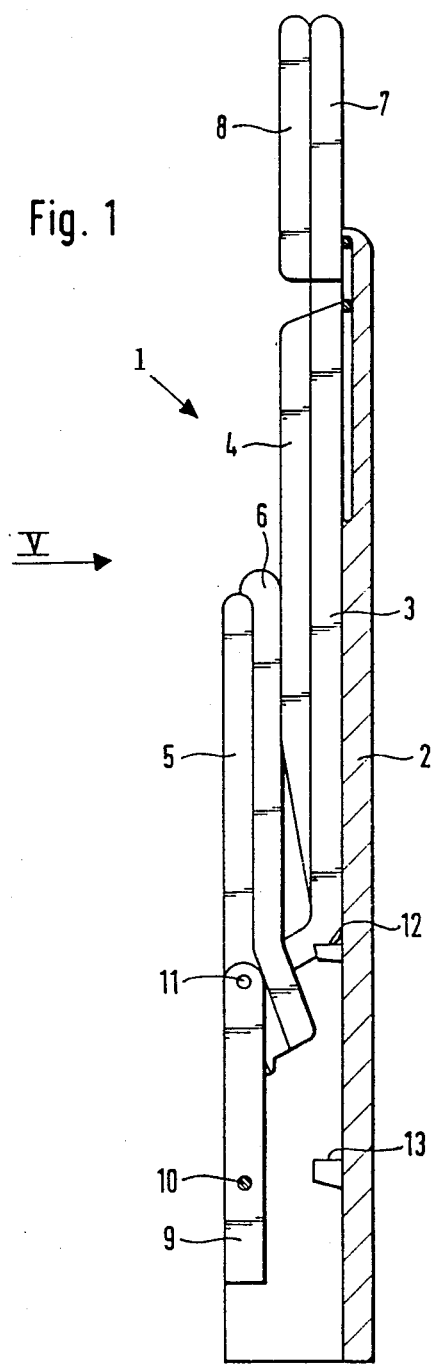
FIG. 1 is a side view, partially in section, of a flight attendant seat according to the invention shown in its folded state.
Figure 2:
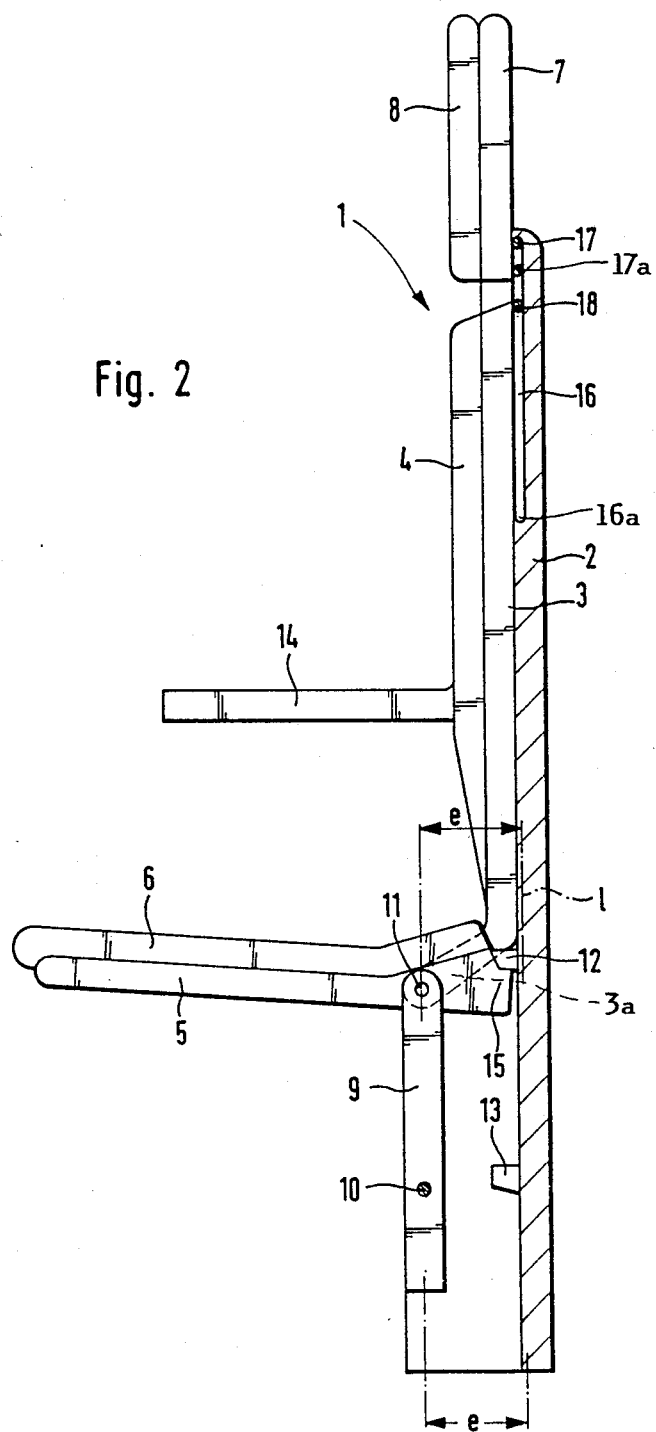
FIG. 2 is a side view of the chair shown in FIG. 1, but now illustrating the chair in one unfolded state or use position.

FIG. 1 shows, partially in section, a first embodiment of a flight attendant seat 1 according to the invention. The seat 1 comprises primarily a frame 2, a backrest shell 3 to hold the backrest cushion 4, a seat shell 5 to hold a seat cushion 6 and a shell 7 to hold the headrest 8. A support and guide member 9, at least one of which is arranged centrally as best seen in FIG. 5, is journalled about a journal axis 10 rigidly secured to the frame 2. The outer free end of the support and guide member 9 provides a pivot bearing for a common rotational axis or journal axis 11 to which the seat shell 5 and the backrest shell 3 are both pivoted for journalling about said common journal axis 11. A first stop 12 is arranged above a second stop 13 in the lower portion of the frame 2. The first stop 12 cooperates with a rear edge 15 of the seat shell 5 as best seen in FIG. 2. The lower stop 13 cooperates with a rear portion 9a of the support and guide member 9 as best seen in FIG. 3. An armrest 14 is arranged on each side of the backrest cushion 4 as best seen in FIGS. 2 and 5. The seat can be secured with its frame 2 to a cabin wall and/or to the floor of an aircraft cabin by conventional means not shown. FIG. 2 illustrates the seat of FIG. 1 in its first use position. A seat section comprising the seat shell 5 and the seat cushion 7 is tilted downwardly about the common pivot or journal axis 11, whereby the rear edge 15 of the seat shell 5 bears against the stop 12 so that a person can now sit on the seat cushion 6. The outward or downward tilting of the shell 5 into the first or upper use position takes place against the force of a spring of a conventional type. The spring is so arranged that upon relieving the seat shell 5 of its load, the spring will return the seat section 5, 6 into the position shown in FIG. 1. FIG. 2 further shows the armrest 14 in its use position. The armrest 14 is also tiltably mounted in a known manner, whereby again a stop not shown will make sure that the armrest 14 can take up a load which is basically directed downwardly. The frame 2 comprises at its upper portion a linear guide structure 16, for example, in the form of an elongated hole for taking up and guiding several slide elements. The slide elements 17 and 17a are secured to the headrest section comprising the headrest shell 7 and the headrest cushion 8. Thus, the headrest section is vertically movable between the positions shown in FIG. 2 and 3. Further, the guide structure 16 holds a slide member 18 which is secured to the upper edge of the backrest shell 3 supporting the backrest cushion 4. Thus, the slide member 18 guided in the elongated hole 16 permits movement of the upper edge of the backrest section 3, 4 between the positions shown in FIGS. 2 and 3. The lower end 16a of the elongated guide hole 16 provides a stop for the slide member 18 to prevent any further downward sliding after the position shown in FIG. 3 has been assumed. The common rotational or journal axis 11 at the lower end of the backrest shell 3 is spaced by the spacing e from a vertical line passing through the center of all guide elements 17, 17a, and 18. This spacing is determined by the length and angular position of the lower end 3a of the backrest shell 3. The angled lower end 3a is shown by dashed lines in FIG. 2.

FIG. 3 illustrates the seat of FIGS. 1 and 2 in a further position of use. In this position the backrest section 3, 4 assumes an acute angular slant relative to the vertical and the seat section 5,6 assumes an acute slant relative to the horizontal. This position is achieved by tilting the support and guide member 9 counterclockwise about the fixed journal axis 10 until the rear end 9a of the support and guide rods 9 bears against the stop 13. This counterclockwise movement also takes place against the force of a spring, not shown, which tends to bias the support and guide member 9 in a clockwise direction. During the counterclockwise movement of the seat section 5, 6, the lower portion of the backrest shell 3 moves together with the journal axis 11 along a curved arc, whereas the upper portion of the backrest shell 3, including the headrest section 7 and 8, travel downwardly along a linear path as guided by the guiding mechanism 16, 17, 17a. This movement can be performed only after a locking mechanism, not shown, has been released. After the rear edge 15 of the seat shell 5 is removed from the stop 12 at the beginning of the rotational movement and during the rotation, the angular relationship between the seat section 5 and 6 relative to the backrest section 3 and 4 remains approximately constant. This feature is achieved because the rear edge 15 of the seat shell 5 bears against the angled portion 3a of the backrest shell 3. As soon as a person gets up from the seating section 5, 6, it returns into its rest position or upwardly tilted position, whereby simultaneously the headrest shell 7, with its headrest 8, returns into the upper position under the effect of the support and guiding member 9, whereby again the folded condition of the seat as shown in FIG. 1 is restored.

The position shown in FIG. 3 is characterized by providing a more comfortable seat due to the slanted position of both the seating section 5 and 6, as well as the backrest section 3 and 4, whereby simultaneously, the seat section 5, 6 is at a lower level above the floor than in the position shown in FIG. 2. This more comfortable seat is achieved because the axis of the spine and the axis of the lower legs of a person sitting on the seat extend approximately in parallel to each other.

In order to increase the comfortableness of the seat still further, the invention provides that practically any use position can be adjusted between the uppermost seat position in the unfolded state shown in FIG. 2 and the completely folded out position shown in FIG. 3. These positions are defined by the end positions of the support and guide member 9. Speaking in kinematic terms, the support and guide member 9, the backrest shell 3, and the journal or pivot guide 18 form an eccentric crank drive having the eccentricity "e" shown in FIG. 3. The shell 3 in such a structure functions as the push rod while the journal pin 18 with the guide 16 functions as the crosshead while "e" is the throw of the crank drive.

FIG. 4 shows the above mentioned locking for securing the headrest shell 7 to the frame 2. For this purpose the frame 2 is provided with teeth 19 in which a locking slide member 21 biased by a spring 20 engages. A ratchet type of action is accomplished by the teeth 19 cooperating with the locking slide member 21, thereby permitting a motion of the shell 7 only in the upward direction as long as the ratchet is effective. A downward motion is prevented by the ratchet until it is withdrawn, for example, by a cable pull 22 enabling a person to withdraw the member 21 against the force of the biasing spring 20, from a tooth engagement. In this manner any upward or downward position is adjustable in steps corresponding to the number of teeth 19. When a person leaves the seat, the upward motion is not impeded by the ratchet mechanism so that the position shown in FIG. 1 is easily assumed.

FIGS. 5 and 6 show the above mentioned seat 1 in a front view and in a side view respectively. These Figs. show in detail the frame 2 with the shells 5 and 7 and the cushions 4, 6, and 8. Although the support and guide member 9 is illustrated as a single element, it could be constructed as two elements one on each side. The armrests 14 are also shown in the folded condition. On the left side under the shell 5 there is a push button 23 connected to the cable pull 22 for releasing the locking 4a by depressing the button 23 to release the above described ratchet mechanism.

Figure 7:
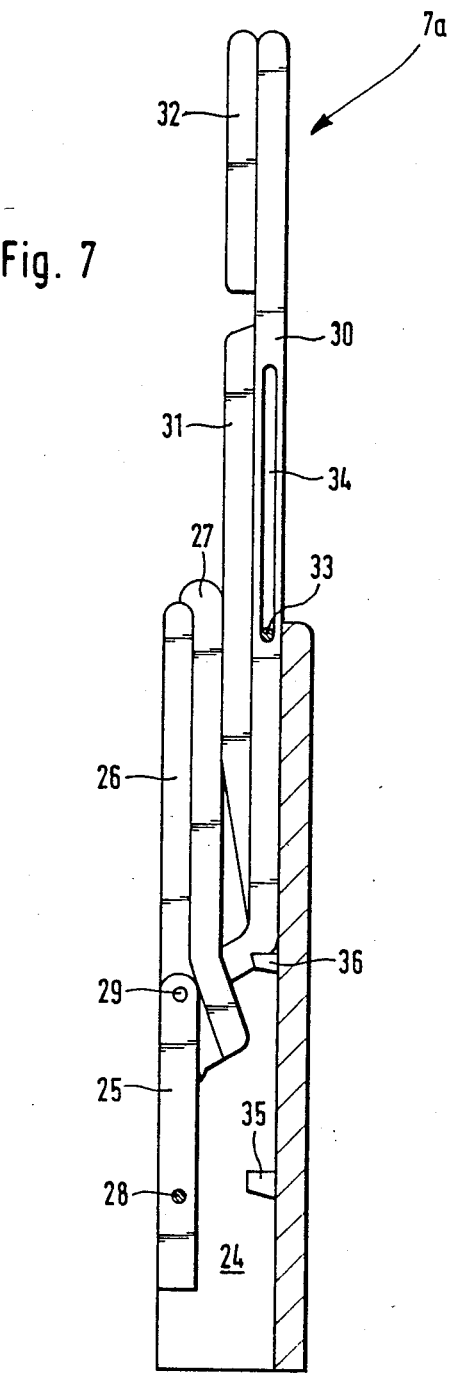
FIG. 7 is a view similar to that of FIG. 1, showing a side view partially in section of a modified embodiment according to the invention, having a headrest tiltable with the backrest.

FIG. 7 illustrates another embodiment of the invention comprising a seat 7a with a frame 24, a support and guide member 25 and a seat shell 26 with a seat cushion 27. The support and guide member 25 is journalled to a fixed axis 28 rigidly secured to the frame 24. The seat shell 26 is journalled or pivoted to the axis 29 at the free end of the support and guide member 25 so that the seat is tiltable relative to the member 25. The embodiment further comprises a backrest shell 30 with a backrest cushion 31 and a headrest cushion 32. A guide mechanism, such as a straight elongated hole or groove 34 is provided along each side of the shell 30. The groove receives a guide element 33 connected to the frame 24. The frame 24 further comprises two stops 35 and 36 similar to the stops 12 and 13. In this embodiment again the seat 7a can be tilted into different use positions by tilting the support and guide member 25 into different positions. In the folded position shown in FIG. 7 the guide element 33 is located at the lower end of the guide groove 34.

FIG. 8 illustrates the seat according to FIG. 7, with the elements 25 to 35 shown in the unfolded lowermost use position which is accomplished in that the support and guide member 25 bears against the stop 35. In this position the guide element 33 bears against the upper end of the guide grooves 34. Thus, the backrest shell 30 assumes the shown slanted position, whereby the headrest cushion 32 also advantageously assumes such a slanted position approximately in line with the backrest cushion 31 so that both are located approximately in the same plane. For fixing the backrest shell 30 relative to the frame 24 a releasable locking mechanism is also employed, but not shown. The locking mechanism may be of the same type as shown in FIG. 4. Again the support and guide member 25 and the shell 30 provide in a kinematic sense a crank drive. However, in this embodiment the crank drive forms a so-called crank loop or crank guide, whereby the support and guide member 25 performs the function of the crank while the shell 30 performs the function of the push rod. Due to the backwardly tilting head portion of the backrest the seat shown in FIGS. 7 and 8 is particularly suitable for attachment to a cabin floor. However, this seat may also be attached to a cabin wall provided that structural provision is made for the backward tilting of the head portion.

Although the invention has been described with reference to specific example embodiments, it will be appreciated, that it is intended, to cover all modifications and equivalents within the scope of the appended claims.

What I claim is:

1. A seat, especially for a flight attendant, comprising a frame, a seat section and a backrest section, pivoting guide means for securing an upper end of said backrest section to said frame for permitting a tilting motion and a linear motion of an upper end portion of said backrest section relative to said frame, first journal means for journalling a lower end portion of said backrest section to a rear portion of said seat section at a common journal axis, support and guide means for operatively securing said seat section and said backrest section to said frame, said support and guide means having a free end journalled to said common journal axis, and second journal means journalling said support and guide means intermediate its ends to said frame at a fixed journal axis in said frame, said support and guide means cooperating with said backrest section in the manner of a crank drive.

2. The seat of claim 1, further comprising a headrest section, said pivoting and guide means comprising pivot means pivotally securing said headrest section to said backrest section, and elongated guide means in said frame, said pivot means sliding in said elongated guide means for securing said headrest and backrest sections to said frame.

3. The seat of claim 2, wherein said elongated guide means comprise two elongated grooves extending approximately vertically in said frame, one on each side of said seat.

4. The seat of claim 1, further comprising a headrest section and a backrest section, said headrest section and said backrest section comprising a common shell, said pivoting guide means comprising elongated guide elements laterally in said common shell and a fixed journal stud in said frame on each side of said common shell, each fixed journal stud engaging its respective elongated guide element for permitting a linear and/or a tilting motion of said common shell.

5. The seat of claim 4, wherein said elongated guide elements comprise an elongated guide hole in each side of said common shell.

6. The seat of claim 1, further comprising locking means for arresting said seat section and said backrest section in any one of a plurality of fixed positions relative to said frame.

7. The seat of claim 6, further comprising a headrest section, said locking means being arranged between said frame and said head rest section.

8. The seat of claim 1, wherein said lower end portion of said backrest section has a bent end which determines a throw of said crank drive.

9. The seat of claim 8, wherein said throw is defined as a horizontal distance between a vertical line through said pivoting guide means and said fixed journal axis.

* * * * *